Patented June 2, 1931

1,808,155

UNITED STATES PATENT OFFICE

HYYM E. BUC, OF ROSELLE, NEW JERSEY, ASSIGNOR TO STANDARD OIL DEVELOPMENT COMPANY, A CORPORATION OF DELAWARE

PROCESS OF MAKING ISOPROPYL ACETATE

No Drawing.    Application filed November 24, 1926. Serial No. 150,625.

This invention relates to improvements in the manufacture of isopropyl acetate by reacting isopropyl alcohol with acetic acid, in the presence of a catalyst and at a distilling temperature. The invention will be fully understood from the following description of a preferred method.

Commercial isopropyl alcohol and acetic acid, preferably glacial acid, are placed in a still. The alcohol may contain about 10% or so of water, and if prepared from petroleum refinery gases will usually have a few percent of tertiary butyl alcohol as its chief organic impurity. More dilute acid and alcohol may be used, but the removal of the larger volume of water retards the process. It is best to have the acetic acid initially present in 100 to 200% excess of the theoretical amount required for reaction with the alcohol. A small amount of a catalyst for the esterification reaction, for example 0.2 to 0.3% by weight of sulfuric acid is preferably added to the charge in the still.

The mixture is distilled and the vapors are rectified. The temperature of the finally rectified vapors should be kept at about 75.5° C. I have found that at this temperature the highest percentage of ester distills over in the form of a substantially constant-boiling mixture. When tertiary butyl alcohol is present, it decomposes during the distillation. The decomposition products appear to reduce the boiling temperature of the constant-boiling mixture, and in such circumstances the temperature of distillation may be allowed to go as low as about 70° C. It should not exceed 76° C. under normal pressure, as the yield of ester falls off rapidly beyond that point. The ester forms the greater part of the distillate, which is composed mostly of ester, alcohol, and water. Very little acetic acid as such distills over at the temperature stated. Fresh alcohol and acid, preferably in the ratio of 2 parts of alcohol to one of acid, are added continuously to keep the volume of reaction mixture substantially constant.

The distillate is condensed and collected in a large container in which it stratifies, forming an upper layer containing the greater portion of the distilled ester, and a lower layer composed mainly of water. The layers are separately withdrawn preferably continuously and slowly so as not to disturb the stratification. Any alcohol and ester in the lower layer are recovered by fractionation for use in the next batch. The ester layer is ordinarily continuously removed for purification by washing with water or the like. The number of washings and the amount of wash water will depend upon the desired purity of the ester. The wash water may be added to the water drawn off from the stratification vessel.

It is sometimes desirable to return a portion or all of the ester layer to the still for redistillation. This should be done, for example, if some difficulty has caused a low percentage of ester in the upper layer.

The washed ester is redistilled, with or without first neutralizing any traces of acid that may contaminate it. The charge is first distilled with fractionation up to a temperature of about 80° C. The residue is substantially water free and may be distilled over with little or no fractionation to produce the finished ester.

The acetic acid in the still becomes progressively more dilute because of the formation of water in the reaction. Only about half of this water comes over at the preferred temperature of distillation, 75.5° C. When the acid no longer reacts efficiently, the distillation is stopped. It is usually not best to continue after the acid is less than about 65% strength.

An 80% or better yield of ester may be obtained by continuing the operation for a sufficient time. However, it is usually more economical to stop when about a 65% yield is obtained, as this can be reached with a relatively brief period of operation.

Any alcohol and ester left in the still may be distilled off and used in the next batch. The acetic acid solution in the still is concentrated for further use, or is otherwise suitably disposed of.

I claim:

1. Process of making isopropyl acetate, comprising distilling a mixture containing isopropyl alcohol, acetic acid and water, rectifying the distilled vapors, holding the finally rectified vapors at a temperature not exceeding 76° C., taking off and condensing the isopropyl acetate formed from the reaction of isopropyl alcohol and acetic acid, together with substances associated with the isopropyl acetate, and separating the isopropyl acetate.

2. Process according to claim 1 in which the isopropyl acetate and associated substances are taken off, the mixture is allowed to stratify, the layer containing a large proportion of isopropyl acetate is withdrawn and the isopropyl acetate is purified by washing with water.

In testimony that I claim the foregoing as my invention, I affix my signature.

HYYM E. BUC.